United States Patent [19]
Connell

[11] Patent Number: 4,739,675
[45] Date of Patent: Apr. 26, 1988

[54] CYLINDRICAL TAPPET

[76] Inventor: Calvin C. Connell, 1618 Twelve Oaks Way, N. Palm Beach, Fla. 33408

[21] Appl. No.: 545,117

[22] Filed: Oct. 25, 1983

Related U.S. Application Data

[63] Continuation of Ser. No. 206,841, Nov. 14, 1980, abandoned.

[51] Int. Cl.[4] .............................................. F16H 53/06
[52] U.S. Cl. ..................... 74/569; 123/90.48
[58] Field of Search ........................ 74/569; 123/90.48

[56] References Cited

U.S. PATENT DOCUMENTS

| | | | |
|---|---|---|---|
| 1,461,560 | 7/1923 | Rich . | |
| 2,445,493 | 7/1948 | Priest | 74/569 |
| 2,735,313 | 2/1956 | Dickson | 74/569 |
| 2,829,540 | 8/1952 | Niemeyer | 74/569 |
| 3,089,473 | 5/1963 | Kueny | 123/90.48 |
| 3,234,815 | 2/1966 | Line | 74/569 |
| 3,303,833 | 2/1967 | Melling | 123/90.48 |
| 3,782,345 | 1/1974 | Erickson et al. | 123/90.48 |
| 3,977,370 | 8/1976 | Humphreys | 123/90.48 |
| 4,335,685 | 6/1982 | Clouse | 123/90.48 |

Primary Examiner—Gary L. Smith
Assistant Examiner—Rodney M. Lindsey
Attorney, Agent, or Firm—Lyman R. Lyon

[57] ABSTRACT

An improved cylindrical tappet for transmitting motion between a camshaft and a valve of an internal combustion engine. The tappet construction affords improved performance by permitting higher lift rates than possible with conventional tappet designs. In addition, cam and tappet face wear and cam walk are minimized due to the construction. The tappet consists of a body portion that is slidably supported in a bore of the engine adjacent to the cam lobe. The body portion has a pocket that is adapted to receive one end of a push rod for actuating the valve upon reciprocation of the tappet body portion. A follower portion is pivotally supported by the body portion about an axis that extends normally to the axis of rotation of the associated cam. The follower portion has a curved cylinder surface which engages the cam lobe and which has a substantially larger radius of curvature than the bore in which the tappet is supported. The pivotal support of the follower portion permits the follower face to maintain full face-to-face contact with the cam lobe.

4 Claims, 1 Drawing Sheet

U.S. Patent
Apr. 26, 1988
4,739,675
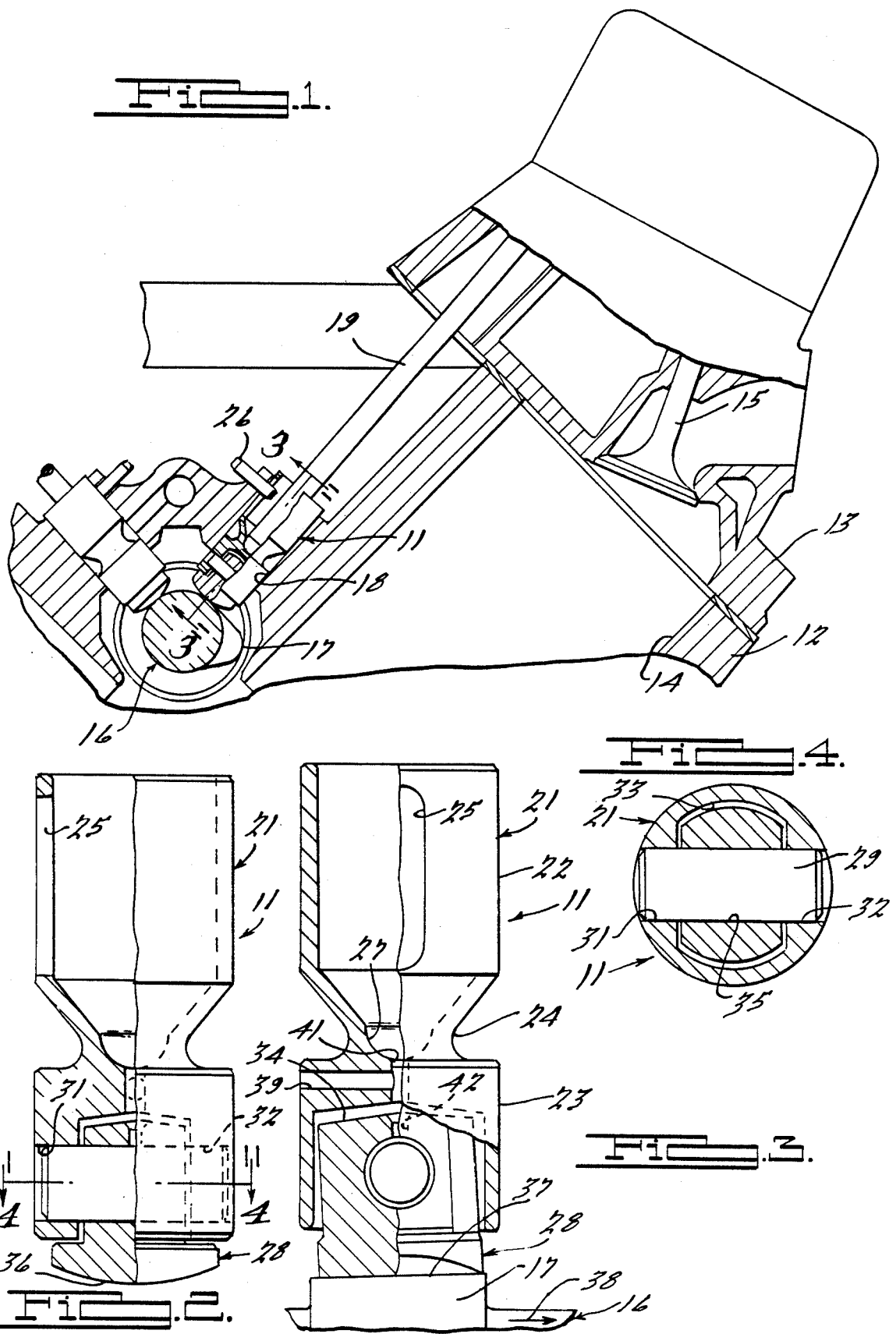

ABSTRACT

CYLINDRICAL TAPPET

This application is a continuation of application Ser. No. 206,841, filed Nov. 14, 1980 and now abandoned.

BACKGROUND OF INVENTION

This invention relates to a valve tappet for an internal combustion engine and more particularly to an improved shoe concept that permits greater engine performance through more radical cam design and minimizes wear on the shoe, cam lobe and associated engine components.

As is well known in cam design for internal combustion engines, it is desirable to provide rapid valve lift which has the effect of maximizing the breathing capacity of the engine while permitting shorter duration than is possible with engines having slower valve lift rates. It has normally been the practice to utilize roller followers to permit cam designs which give such rapid lift rates. However, if the diameter of the roller which engages the cam surface is too small, serious limitations in cam design result. That is, the cam profile for such small radius rollers causes concave or reverse flanks which increase the likelihood of jamming at both the cam and roller engaging surface and unduly large cocking loads on the tappet. If standard acceleration rates are used, the cam lobes for such engines must be ground by means of extremely small diameter grinding wheels which has the effect of increasing the cost of the camshaft. Roller tappets in general also have the disadvantage of "edge riding." This results from the extreme difficulty in maintaining complete perpendicularity between the cam lobe surface and the roller surface with the result that the roller follower has a tendency to contact only the edge of the cam lobe resulting in very high wear on the lobe.

When the tappet is used with an engine having its camshaft in the block, the roller follower must be small enough so as to pass through the bore in which the tappet is supported. If this is not true, assembly and servicing of the engine becomes very difficult and major changes must be made to the engine block design to permit other forms of assembly.

For the foregoing reasons, it has been the common practice to provide tappets having substantially flat lower faces which contact the cam lobes.

Such flat face tappets do lend themselves to rapid valve opening and closure but have limitations as to the maximum velocity of valve movement which may be accomplished due to tappet diameter and nose radius development. Another problem inherent with cam and follower design for the valve train of an internal combustion engine is the maintenance of low unit pressure loads on the engaging surfaces. With conventional flat face tappets, which actually are tappets having a large spherical radius rather than being flat (about 60 inches radius), the contact between the cam and follower is at best line contact. The high unit loading obviously results in considerable wear and dictates low valve spring loads through more conservative valve opening and closure rates.

The difficulty in maintaining perpendicularity on the cam mating surfaces also gives rise to a situation known as cam walk. That is, misalignment or uneven contact between the cam follower and cam lobe surface exerts axial forces on the camshaft. With flat type follower it has been the practice to use a small degree of inclination so as to reduce such cam walk and to induce an axial force on the camshaft in the desired direction. This eliminates or reduces the necessity for providing thrust bearings for the camshaft. With flat type followers, this practice further aggravates the wear situation since it further minimizes the area of contact between cam and follower. It has been next to impossible to provide such inclined cam lobe surface with roller followers due to the edge riding problem aforedescribed.

It is therefore a principal object of this invention to provide an improved valve tappet for an internal combustion engine that minimizes wear on the components associated with the valve train.

It is another object of this invention to provide an improved valve tappet which minimizes the likelihood of binding of the tappet in its supporting bore and which also reduces the tendency for cam walk to occur.

It is still a further object of this invention to provide an improved valve tappet which improves contact area and permits more rapid valve opening and closing while still being capable of use in an overhead valve engine in which the camshaft is journaled in the engine block.

It is yet another object of the invention to provide an improved valve tappet that permits a wider latitude of valve timing and duration with a given camshaft and which facilitates changes in timing and duration to be made without necessitating replacement of the camshaft.

BRIEF SUMMARY OF THE INVENTION

This invention is adapted to be embodied in a valve tappet for transmitting motion from a cam to the valve of an internal combustion engine. The tappet is adapted to be slidably supported in a bore of the engine formed adjacent the cam. The tappet has a cylindrical body portion that is adapted to be slidably supporting in the bore. The body portion also defines a valve actuating segment that is adapted to transmit motion to an associated valve upon reciprocation of the body portion in the associated supporting bore. A follower portion or shoe is also provided which has a curved surface that is adapted to be engaged with the lobe of the associated cam for reciprocating the body portion in the bore upon the rotation of the cam about its axis. The radius of the curvature of the follower portion surface is substantially greater than the diameter of the body portion. Means support the follower portion upon the body portion for movement about an axis that extends substantially normally to the face of the cam engaged by the follower portion for permitting the follower portion to maintain substantially full face width engagement with the lobe of the associated cam.

BRIEF DESCRIPTION OF THE DRAWINGS

FIG. 1 is a partial cross-sectional view taken through one cylinder bore of a V-type engine embodying this invention;

FIG. 2 is an enlarged elevational view, with one half broken away, of the tappets used in the engine of FIG. 1 and looking in the same direction as this figure;

FIG. 3 is a cross-sectional view taken and enlarged to the same scale as FIG. 2, and taken generally along the line 3—3 in FIG. 1;

FIG. 4 is a cross-sectional view taken along the line 5—5 of FIG. 1.

DETAILED DESCRIPTION OF THE PREFERRED EMBODIMENT

FIG. 1 illustrates a portion of a V-type, overhead valve, camshaft in block type of engine. Except for the tappet construction employed with the engine, the tappet being identified generally by the reference numeral 11, the engine is conventional. For this reason only those components of the engine which are necessary to understand the construction and operation of the tappet 11 will be described in detail.

The engine includes a cylinder block 12 to which cylinder heads 13 for each bank are affixed in a known manner. Only one bank has been illustrated in FIG. 1. Cylinder bores 14 are formed in the block and intake and exhaust valves are supported in the cylinder head 13 for cooperation with each cylinder bore 14. Only one valve 15 has been illustrated in the drawings. A camshaft, indicated generally by the reference numeral 16, is rotatably supported in the cylinder block 12 in the valley of the V. The camshaft 16 is formed with cam lobes 17 for operating the valves 15.

Motion is transmitted from the cam lobes 17 to the tappets 11, which are slidably supported in bores 18 of the cylinder block 12 contiguous to the camshaft 16. The tappets 11 in turn drive push rods 19 which operate the valves 15 through a conventional rocker arm arrangement (not shown).

Turning now to the construction of tappet 11, they are best shown in FIGS. 2 through 4 and include a body portion, indicated generally by the reference numeral 21, which has a generally hour-glass shape consisting of a hollow upper cylindrical portion 22, a lower cylindrical portion 23, and an interconnecting tapered portion 24. The body portion 21 may be formed from any desired material and may be formed from lower grade or lighter materials than normally used with conventional tappets inasmuch as its follower surface, as will become apparent, may be made from a different material. The cylindrical portion 22 is formed with a longitudinal extending groove 25 in one side thereof which receives a pin or spring-pin 26 which is pressed into the cylinder block 12 for holding the tappet 18 against rotation. The intermediate tappet body portion 24 is formed with a spherical socket 27 which receives the lower end of the push rod 19 for operating the push rod 19 upon reciprocation of the tapper 11 in the bore 18.

A follower shoe, indicated generally by the reference numeral 28, is supported for pivotal movement about an axis that extends normal to the axis of rotation of the camshaft 16 by means of a pivot pin or axle 29. The axle 29 is received in a pair of aligned bores 31 and 32 formed in the body portion 23. The body portion 23 has an internal cavity 33 into which an upwardly extending portion 34 of the shoe 28 extends. The shoe portion 34 is bored, as at 35, so as to pass the pin or axle 29 and pivotally support the shoe 28 upon the axle 29 and tappet body portion 21.

The shoe 28 has a cylindrical sole portion 36 which has a radius of curvature that is substantially greater than the diameter of the cylinder portions 22 and 23 of the tappet body 21. This has the effect of functioning as a roller follower that has such a large diameter. A true roller of this diameter could not be employed, however, because of the necessity for the roller or follower to pass through the engine block bore 18 upon assembly or disassembly.

As seen in FIG. 3, the face 37 of the cam lobe 17 is tapered in a predetermined direction so as to create a thrust force in the direction of the arrow 38 in FIG. 3. This thrust force is used to properly direct the thrust of the camshaft 16. Because of the pivotal support of the shoe 28 on the tappet body 21, the shoe may pivot about its axis so as to insure full face contact with the full lobe surface 37.

The intermediate portion 23 of the tappet body 21 is formed with an oil passage 39 that receives oil pressure from the lubrication system of the engine through appropriately located gallery in the block 12. Oil from the passage 39 is delivered to a vertically extending passage 41 which terminates at its upper end in the socket 27 for delivery to the overhead portion of the valve train through the push rod 19 in a known manner. The lower end of the passage 41 extends into the cavity 33 and is juxtaposed to an oil passage 42 formed in the shoe portion 34 which intersects the bore 35 for lubrication of the journaling surface of the shoe 28.

It should be readily apparent that the construction of the tappet 11 achieves the aforedescribed advantages. That is, the pivotal mounting of the shoe 28 insures high contact area between the shoe 28 and cam lobe 17. This high contact area is further maximized due to the substantial radius of the shoe sole 36. The large radius of the surface 36 permits high opening and closing velocity for valve 15 while maintaining generous cam lobe nose radius and eliminating concave or reverse cam lobe flanks. The pivotal support of the shoe 28 also minimizes clocking loads on the tappet within the bore 18. Because the shoe 28 is formed from a separate piece from the body portion 21, it may be formed from a more exotic material such as carboloys or high grade steel without significantly adding to the overall cost of the tappet 11. The small overall size of the shoe 28 permits it to be assembled into the bore 18 from above and thus permits replacement of conventional tappets in existing engines while achieving all of the aforenoted advantages. Also the cam timing with a given camshaft may be readily varied by changing the configuration of the shoe surface 26.

It is to be understood that the foregoing description is that of a preferred embodiment of the invention and that various changes and modifications may be made without departing from the spirit and scope of the invention, as defined by the appended claims.

What is claimed is:

1. A tappet for transmitting motion from a rotatable cam to a valve of an internal combustion engine, said tappet being slidably supported for reciprocation along a first axis in a cylindrical bore of the engine, said tappet comprising a circular cylindrical body portion adapted to be slidably supported in the bore of the engine, a cam follower portion on said tappet having a cam engaging face comprising a segment of a circular cylinder the axis of generation of which extends parallel to the axis of rotation of said engine cam and the radius of generation of which is substantially greater than the radius of generation of the circular body portion of said tappet, said cam follower portion being contained entirely within the circular cross section of the body portion of said tappet so as to be reciprocable within the bore in said engine, and pivot means supporting the cam follower portion of said tappet for rotation relative to the body portion thereof about an axis extending at a right angle to the axis of reciprocation of said tappet and lying in a plane extending at a right angle to the axis of generation of the cam engaging face on the cam follower portion of said tappet.

2. A valve tappet as set forth in claim 1 wherein the cam follower portion on said tappet is sized so that it may be inserted into and through the supporting bore of the engine from the side opposite the cam.

3. A valve tappet as set forth in claim 1 wherein the cam follower portion is detachably connected to the body portion by said pivot means.

4. A valve tappet as set forth in claim 1 wherein the body portion has a cavity at one end thereof and the cam follower portion has a portion extending into said cavity, said pivot means for supporting the follower portion comprising a pin extending through the cam follower portion and supported by the body portion.

* * * * *